April 30, 1957  F. WINKLER  2,790,397
DOUGH ROUNDING MACHINE
Filed Feb. 16, 1954

FRIDOLIN WINKLER
Inventor:

by Mason, Porter, Miller + Stewart
Attorneys

United States Patent Office 2,790,397
Patented Apr. 30, 1957

2,790,397

DOUGH ROUNDING MACHINE

Fridolin Winkler, Villingen, Black Forest, Germany

Application February 16, 1954, Serial No. 410,682

4 Claims. (Cl. 107—9)

The invention relates to a rounding machine for lumps of dough and particularly to such machines in which the lumps of dough pass along a working trough covered by a plate, preferably concave, and which trough is formed by an endless conveyor band, and a second roller arranged directly above the conveying surface of the conveyor band, and which in plan view is at an angle to the conveying direction of said band, rotates in the opposite direction thereto.

The known dough rounding machines of this type only operate satisfactorily when the lumps of dough fed thereto have a moist surface. However, it frequently happens that the lumps of dough coming from the dough dividing or portioning machine are crusty, that is, a dry skin has formed on the surface thereof with the result that the lumps of dough in the working trough slide on the smooth surface of the conveyor bands instead of rolling thereon.

Another disadvantage of the known dough rounding machines of the kind mentioned, is that they cannot be served by hand as quickly as they work. Thus, for example, a dough rounding machine of the kind in question can work up more than 4,000 lumps of dough into balls in an hour if the lumps are fed at the necessary speed, but it is not possible to feed the dough lumps at that speed by hand.

In order to overcome these objections it is proposed according to the invention, to arrange a mechanically fed pre-working device in front of the inlet of the working trough of the machine, which device consists of a roughened, rotatably mounted drum, preferably provided with ribs, and a channel extending round the drum in a spiral and open towards the drum, which channel first narrows in cross section or becomes more shallow and then deepens or widens in front of the inlet to the working trough. Owing to the rough surface of the drum of this pre-working device, the crust of the lumps of dough is abraded and the moist inner portion brought to the surface during the preliminary working operation and consequently the pre-worked dough lumps pass into the working trough of the dough rounding machine with a moist surface.

According to another feature of the invention, the drum of the pre-working device is rotatably mounted in front of and above the inlet of the working trough and the pre-working channel ends over the conveyor band forming part of the working trough, the pre-working channel being preferably widened or deepened in cross-section towards its outlet end. The construction of the pre-working device presents the advantage that the lumps of dough drop through the pre-working channel in downward direction and the pre-worked lumps of dough leave the pre-working channel automatically and arrive on the conveyor band of the working machine trough which feeds them automatically into the trough.

Another feature of the invention provides for the arrangement of a funnel at the entrance to the pre-working channel, into which funnel the lumps of dough drop off the end of a conveyor band leading from a dough portioning or dividing machine (not shown). It is advisable for the lumps of dough to be fed onto the drum of the pre-working device by free-fall from such a height that the surface of the lumps of dough will be deformed on coming into contact with the surface of the drum of the pre-working device provided with ribs, with the result that the lumps of dough will immediately be carried along by the drum.

The mechanical feeding of the lumps of dough to the pre-working device and the direct delivery of the pre-worked lumps of dough to the rounding arrangement, enable the quickest possible and uninterrupted feeding of the round working machine.

A dough rounding machine according to the invention is illustrated by way of example in the accompanying drawing, in which.

Figure 1:
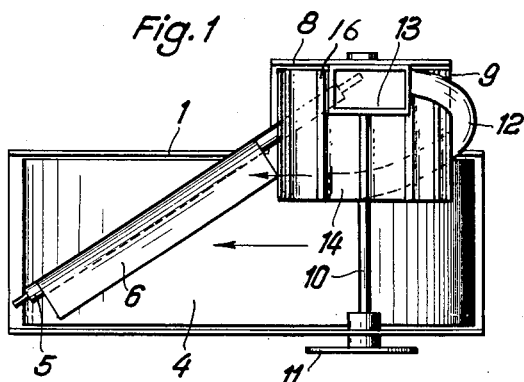
Fig. 1 is a diagrammatic top plan view of the machine.

The machine according to the invention consists of a machine frame 1, in which two rollers 2 and 3 are rotatably mounted and over which an endless conveyor band 4 runs. A roller 5 rests on the conveying surface of this band and in plan view is at an angle to the conveying direction (Fig. 1), the roller being rotated in the same sense as the direction of movement of the conveyor band. The conveyor band 4 and roller 5 enclose a portion of the working trough of the round working machine, the working trough being completed by a cover plate 6, preferably of concave shape in cross-section, which is carried by the machine in any suitable manner and may at the same time be constructed as a stripper 7 for the roller 5.

Figure 2:
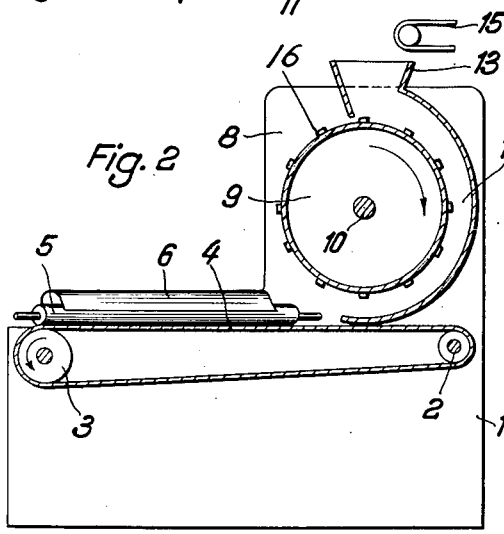
Fig. 2 is a section taken on line II—II of Fig. 3.
Figure 3:
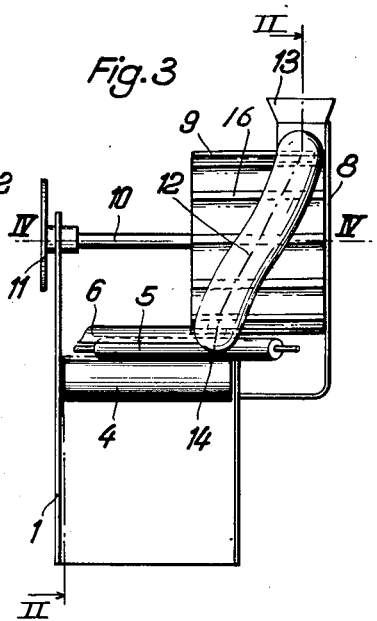
Fig. 3 shows the machine in elevation viewed from the right.
Figure 4:
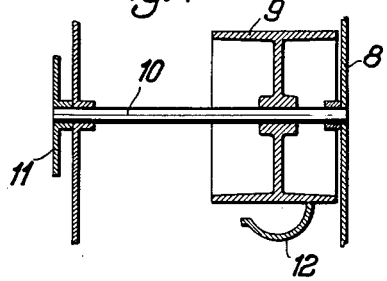
Fig. 4 is a section through the pre-working device taken on line IV—IV of Fig. 3.
Figure 5:
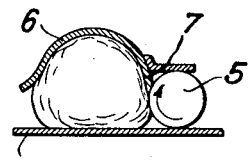
Fig. 5 is a section through the working trough of the dough rounding device taken on the line V—V on Fig. 1.

Near the inlet of the working trough of the dough rounding machine above described, the machine frame 1 extends upwards at 8 and carries a drum 9 rotatable in front of and above the said inlet point. This drum is mounted on a shaft 10 which can be driven, for example, by a wheel 11 mounted thereon outside the machine frame 1. Around the right half of the drum 9 (Fig. 2) a channel 12, open towards the drum, extends in the form of a spiral and is provided with a funnel 13 at its inlet end. This channel first narrows in cross-section and then widens slightly towards its end 14. The end of the channel is located in the feeding direction of the conveyor band 4 in front of the inlet to the working trough 4, 5, 6, and the conveyor band 4 extends under the end 14 of the channel 12.

The surface of the drum 9 is roughened, preferably by ribs 16 extending parallel to the axis of the drum. The funnel 13 is located below an endless conveyor belt 15 leading from the dough dividing machine, not shown on the drawing.

The machine operates in the following manner:

The lumps of dough fed by the conveyor belt 15 drop off the end thereof into the funnel 13 and land on the drum 9. The height of drop is preferably so chosen that the lumps of dough on striking against the drum adapt themselves to the shape of the ribs on the surface thereof at the point of contact and as a result are immediately carried along by the drum in the direction of the arrow on Fig. 2. The lumps of dough thus pass into the channel 12 in which they are pre-worked. If the lumps are crusty the ribs on the drum 9 exert a rubbing effect and bring the moist interior to the surface of the lumps during the pre-working process.

The pre-worked lumps of dough with moistened surface roll out of the channel 12, which widens or deepens slightly in cross-section towards its ends, and pass on to the conveyor band 4 which carries them along and feeds them into the dough rounding device. In the working trough of this device the lumps of dough are rolled by the movements of the conveyor band 4 and the roller 5 in such a manner that they leave the trough as absolutely round lumps of dough.

I claim:

1. A dough rounding machine comprising in combination with a working trough formed by an endless conveyor band, a combined working and conveying roller journaled above the band on an axis oblique to the direction of movement of the band and a concave plate mounted with its concavity facing the upper surface of the band on the forward or entrance side of said roller and extending parallel to the longitudinal axis thereof, a mechanically fed pre-working device arranged in front of the inlet to said working trough and consisting of a roughened rotatably mounted drum and a channel wound in spiral shape around said drum, said channel being open towards the drum, narrowing in cross-section and terminating in front of the working trough.

2. A dough rounding machine as set forth in claim 1, wherein the drum of the pre-working device is rotatably mounted horizontally in front of and above the inlet to the working trough and the pre-working channel terminates above the conveyor band which forms part of the said trough.

3. A dough rounding machine as set forth in claim 1, wherein the pre-working channel widens in depth at its outlet end.

4. A dough rounding machine as set forth in claim 1, wherein a funnel is provided to make the lumps of dough drop directly onto the roughened drum of the pre-working device in free fall and are immediately carried along by the drum into the pre-working channel.

References Cited in the file of this patent
UNITED STATES PATENTS

| | | |
|---|---|---|
| 640,944 | Pointon et al. | Jan. 9, 1900 |
| 959,767 | Timmer | May 31, 1910 |
| 1,037,343 | Shupe | Sept. 3, 1912 |
| 1,163,814 | Eckel | Dec. 14, 1915 |
| 1,192,973 | Allison | Aug. 1, 1916 |